(12) United States Patent
Tanio

(10) Patent No.: US 12,242,221 B2
(45) Date of Patent: Mar. 4, 2025

(54) LOCKING MECHANISM, AND IMAGE FORMING DEVICE

(71) Applicant: KYOCERA Document Solutions Inc., Osaka (JP)

(72) Inventor: Koji Tanio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/556,960

(22) PCT Filed: Mar. 29, 2022

(86) PCT No.: PCT/JP2022/015443
§ 371 (c)(1),
(2) Date: Oct. 24, 2023

(87) PCT Pub. No.: WO2022/230554
PCT Pub. Date: Nov. 3, 2022

(65) Prior Publication Data
US 2024/0369964 A1 Nov. 7, 2024

(30) Foreign Application Priority Data

Apr. 30, 2021 (JP) ................................ 2021-077122

(51) Int. Cl.
*G03G 21/16* (2006.01)
*G03G 15/00* (2006.01)

(52) U.S. Cl.
CPC ....... *G03G 21/1647* (2013.01); *G03G 15/556* (2013.01); *G03G 21/1633* (2013.01); *G03G 2221/1654* (2013.01)

(58) Field of Classification Search
CPC ............ G03G 15/556; G03G 21/1633; G03G 21/1647; G03G 21/1676; G03G 2221/1654; G03G 15/08; G03G 21/00; G03G 21/16
See application file for complete search history.

(56) References Cited

U.S. PATENT DOCUMENTS

| 8,032,058 B2 * | 10/2011 | Fukuda | G03G 21/1676 399/119 |
| 8,190,039 B2 * | 5/2012 | Iida | G03G 15/0896 399/15 |
| 2011/0058825 A1 * | 3/2011 | Tsukijima | G03G 21/1633 399/258 |

FOREIGN PATENT DOCUMENTS

JP 2005-091462 A 4/2005

* cited by examiner

*Primary Examiner* — Sophia S Chen
(74) *Attorney, Agent, or Firm* — Studebaker & Brackett PC

(57) ABSTRACT

A locking mechanism (50) is a locking mechanism of a toner container which is replaceable in a state where an opening/closing cover (60) supported by a housing (10) is opened, and the locking mechanism (50) includes a lock member (43) provided in the housing (50) and restricting a detachment of the toner container; an operating lever (63) turnably supported by the opening/closing cover (60) and operating the lock member (43); and a spring member (66) provided in the opening/closing cover (60) and supporting the operating lever (63) elastically, wherein the lock member (43) is turnable between an unlock posture and a lock posture, and the operating lever (63) operates the lock member (43) from the unlock posture to the lock posture according to a movement of the opening/closing cover (60) to a closing direction.

7 Claims, 10 Drawing Sheets

--Prior Art--

--Prior Art--

LOCKING MECHANISM, AND IMAGE FORMING DEVICE

TECHNICAL FIELD

The present invention relates to a locking mechanism and an image forming apparatus.

BACKGROUND

Normally, the toner container in the image forming apparatus is replaced with a new one when it is empty, but there is a problem in which the toner container could be replaced by the user before the toner is used up. For this reason, a locking mechanism is known to restrict the detachment of the toner container according to the remaining amount of the toner in the toner container (see, Patent Document 1). In the locking mechanism described in Patent Document 1, a stopper is connected to a solenoid, and the toner container is retained in place by this stopper. Until the remaining amount of the toner in the toner container is low, the solenoid is not driven to restrict the detachment of the toner container.

PRIOR ART DOCUMENTS

Patent Document

Patent Document 1: Japanese Patent Laid-Open No. 2005-091462

SUMMARY OF THE INVENTION

Problems to be Solved by Invention

However, the locking mechanism of Patent Document 1 requires a locking operation to manually return the stopper after replacing the toner container, so some users may forget the locking operation.

Therefore, it is an object of the present invention to restrict the detachment of the toner container and to ensure the locking operation after the replacement of the toner container.

Means of Solving the Problems

A locking mechanism according to one aspect of the present invention is a locking mechanism of a toner container which is replaceable in a state where an opening/closing cover supported by a housing is opened, and the locking mechanism includes a lock member provided in the housing and restricting a detachment of the toner container; an operating lever turnably supported by the opening/closing cover and operating the lock member; and a spring member provided in the opening/closing cover and supporting the operating lever elastically, wherein the lock member is turnable between an unlock posture in which the detachment of the toner container is permitted and a lock posture in which the detachment of the toner container is restricted, and the operating lever operates the lock member from the unlock posture to the lock posture according to a movement of the opening/closing cover to a closing direction.

An image forming apparatus according to one aspect of the present invention includes the locking mechanism and a remaining amount sensor which detects a remaining amount of the toner in the toner container, wherein the lock member is held in the lock posture until the remaining amount of the toner is equal to or smaller than a predetermined amount.

Effect of Invention

According to the present invention, the lock member is operated from the unlock posture to the lock posture by the operating lever in conjunction with the movement of the opening/closing cover in the closing direction. Therefore, the locking operation after the replacement of the toner container can be reliably performed by closing the opening/closing cover. In addition, even when the operating lever comes in contact with the lock member, the operating lever is retreated against the spring force of the spring member, so that the lock member is not applied with excessive external force from the operating lever. Therefore, deformation and breakage of parts such as the lock member and the operating lever are prevented.

EMBODIMENT FOR CARRYING OUT THE INVENTION

Figure 1:
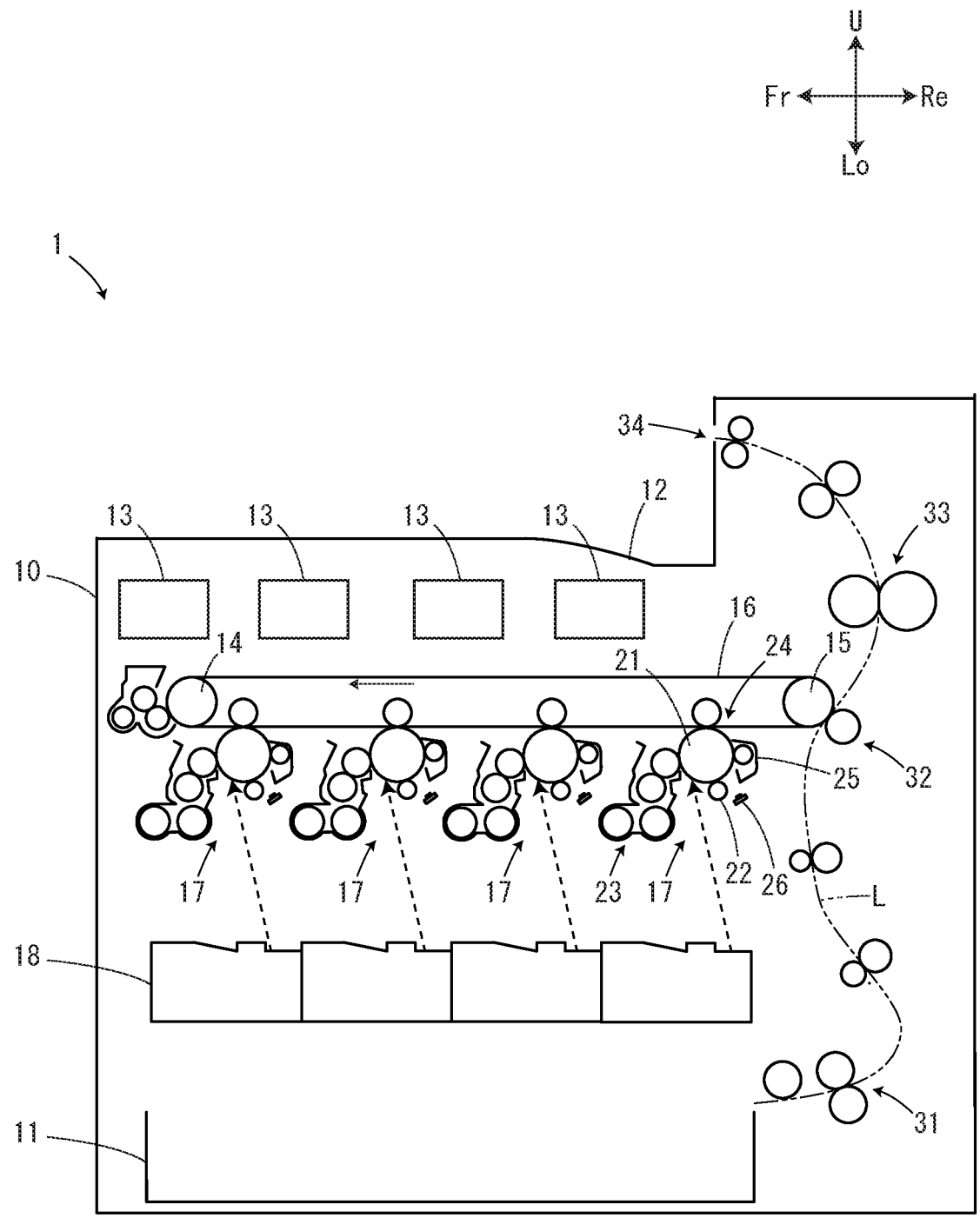
FIG. 1 is a schematic view showing a printer according to the present embodiment.

Hereinafter, with reference to the drawings, an image forming apparatus to which a locking mechanism of this embodiment is applied will be described. In the following description, a printer is shown as an example of the image forming apparatus. FIG. 1 is a schematic view showing the printer of this embodiment. Arrows Fr, Re, U, and Lo, which are appropriately attached to each figure, indicate the front, rear, upper, and lower sides of the printer, respectively.

As shown in FIG. 1, the printer 1 includes a box-shaped housing 10 housing various devices. In the lower portion of the housing 10, a sheet feeding cassette 11 in which a sheet bundle is set is housed, and in the upper portion of the housing 10, a sheet discharge tray 12 on which the sheet having an image is stacked is provided. Below the sheet discharge tray 12, a toner container 13 containing toner is detachably set for each color of the toner (for example, four colors including magenta, cyan, yellow, and black). Below the toner containers 13, an intermediate transfer belt 16 stretched around a pair of rollers 14, 15 is provided.

Along the underside of the intermediate transfer belt 16, image forming parts 17 for colors of the toner are provided in a row in the front-and-rear direction. Each of the image forming part 17 is provided with a photosensitive drum 21 rotatably in contact with the intermediate transfer belt 16, and around the photosensitive drum 21, a charging device 22, a developing device 23, a primary transfer part 24, a cleaning device 25, and an electrostatic eliminating device 26 are arranged in the order of a primary transferring process. A waste toner box (not shown) is connected to the cleaning device 25. The toner is supplied from the toner container 13 through a supply path (not shown) to each developing device 23, and waste toner is discharged from each cleaning device 25 through a discharge path (not shown) to the waste toner box.

Below the image forming parts 17, an exposure device 18 composed of a laser scanning unit (LSU) is provided. In the side portion in the housing 10, a sheet conveyance path L is formed by multiple rollers from the sheet feeding cassette 11 to the sheet discharge tray 12. A sheet feeding part 31 is provided on the upstream side portion of the conveyance path L (the lower side), and a secondary transfer part 32 is provided on the downstream side of the sheet feeding part 31 in the conveyance direction at the side end of the intermediate transfer belt 16. A fixing device 33 is provided on the downstream side of the secondary transfer part 32 in the conveyance path L, and a sheet discharge port 34 is provided on the downstream end of the conveyance path L (the upper side).

In the image forming operation of the printer 1, after the surface of the photosensitive drum 21 is charged by the charging device 22, an electrostatic latent image is formed on the surface of the photosensitive drum 21 by the laser light from the exposure device 18. Then, the toner is adhered from the developing device 23 to the electrostatic latent image on the surface of the photosensitive drum 21 to form a toner image, and the toner image is primary transferred from the surface of the photosensitive drum 21 to the surface of the intermediate transfer belt 16. A full-color toner image is formed on the surface of the intermediate transfer belt 16 by primary transferring of each color toner image to the intermediate transfer belt 16 in each image forming part 17. The waste toner and charge remaining on the photosensitive drum 21 are removed by the cleaning device 25 and the electrostatic eliminating device 26.

On the other hand, the sheet is picked up by the sheet feeding part 31 from the sheet feeding cassette 11 or a manual sheet feeding tray (not shown), and the sheet is conveyed toward the secondary transfer part 32 in timing with the image forming operation described above. In the secondary transfer part 32, the full-color toner image is secondarily transferred from the surface of the intermediate transfer belt 16 to the surface of the sheet, and the sheet on which the toner image is transferred is conveyed toward the fixing device 33 downstream of the secondary transfer part 32. In the fixing device 33, the toner image is fixed on the sheet, and the sheet having the fixed toner image is discharged from the sheet discharge port 34 onto the sheet discharge tray 12. Thus, the image is formed on the surface of the sheet by passing the toner image transferred to the sheet through the fixing device 33.

Figure 4:
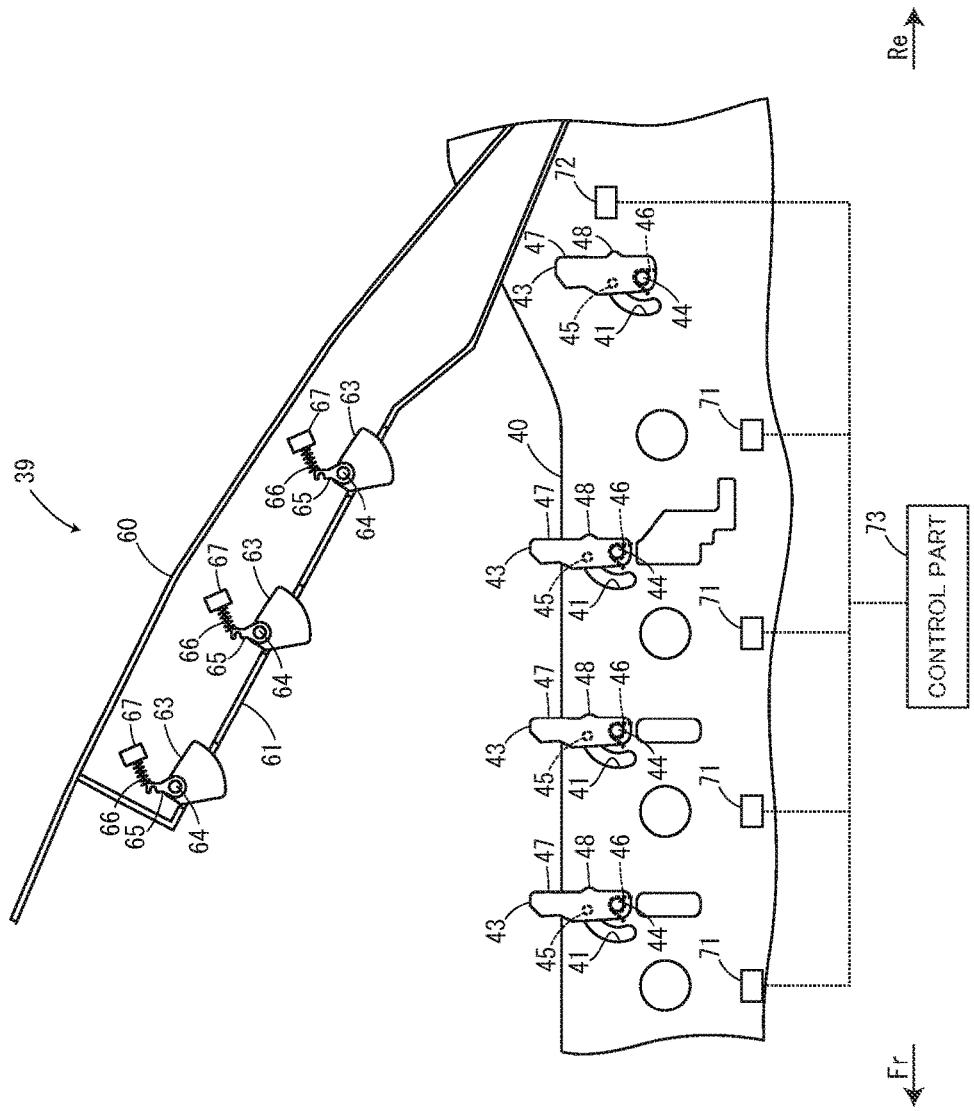
FIG. 4 is a schematic view showing an opening/closing cover and the others according to the present embodiment.

Incidentally, the bottom surface of the sheet discharge tray 12 is formed by an opening/closing cover 60 (see FIG. 4). By opening the opening/closing cover 60, a replacement work of the toner container 13 in the housing 10 is carried out. In the printer 1, in order to prevent the toner container 13 from being replaced before the toner is used up, the detachment of the toner container 13 is restricted by a lock member 43 (see FIG. 4) until the remaining amount of toner is low. The detachment of the toner container 13 is permitted by the lock member 43 in a standing posture, and the detachment of the toner container 13 is restricted by the lock member 43 in a lying posture.

Figure 2:
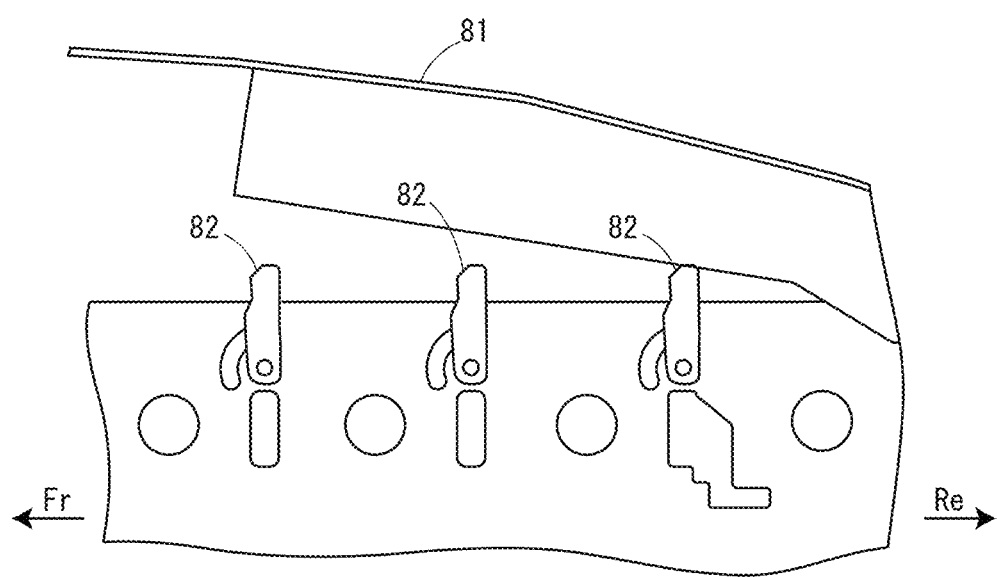
FIG. 2 is a schematic view showing an example a locking operation in a locking mechanism according to a comparative example.
Figure 3:
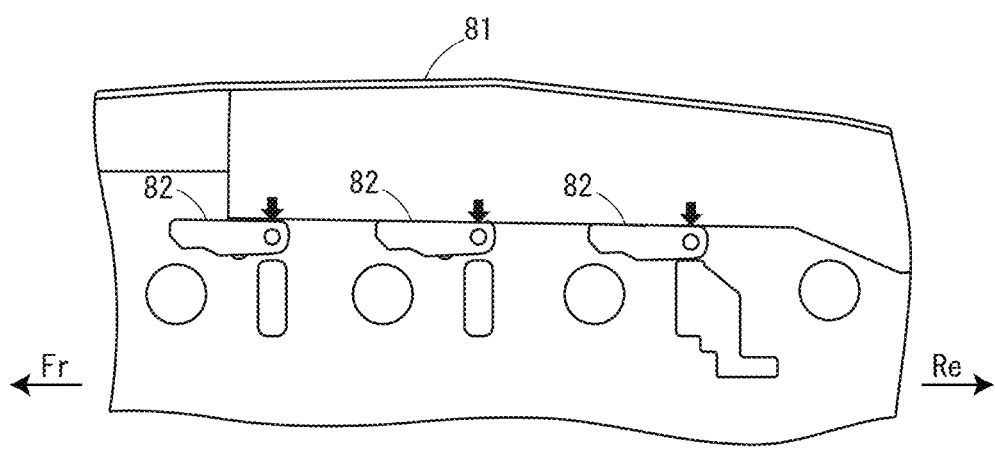
FIG. 3 is a schematic view showing the example the locking operation in the locking mechanism according to the comparative example.

As shown in the comparative example of FIG. 2, in order to restrict the detachment of the toner container 13, a locking operation is required to bring the lock member 82 down from the standing posture to the lying posture. However, when the opening/closing cover 81 is closed while the locking operation is forgotten, there is a risk that the lock member 82 collides with the opening/closing cover 81. As shown in the comparative example of FIG. 3, if the lock member 82 is pushed strongly into the opening/closing cover 81, the base end of the lock member 82 may be applied with strong external force from the opening/closing cover 81 and damaged. Therefore, in the opening/closing cover 60 of this embodiment, an operating lever 63 (see FIG. 4) is provided on the opening/closing cover 60 to relieve the pushing against the lock member 43.

Figure 5:
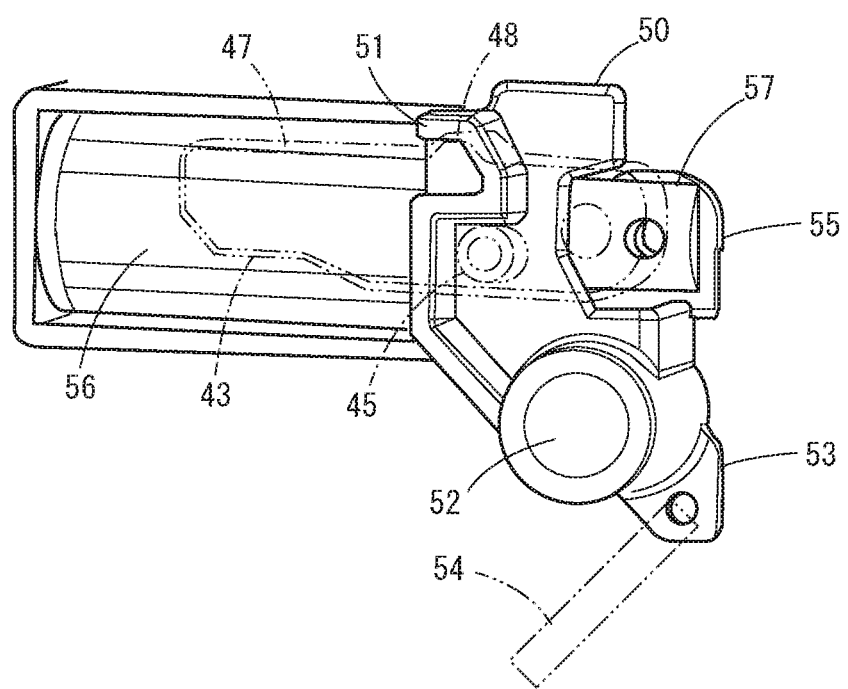
FIG. 5 is a perspective view showing a hook member in a hooking state according to the present embodiment.
Figure 6:
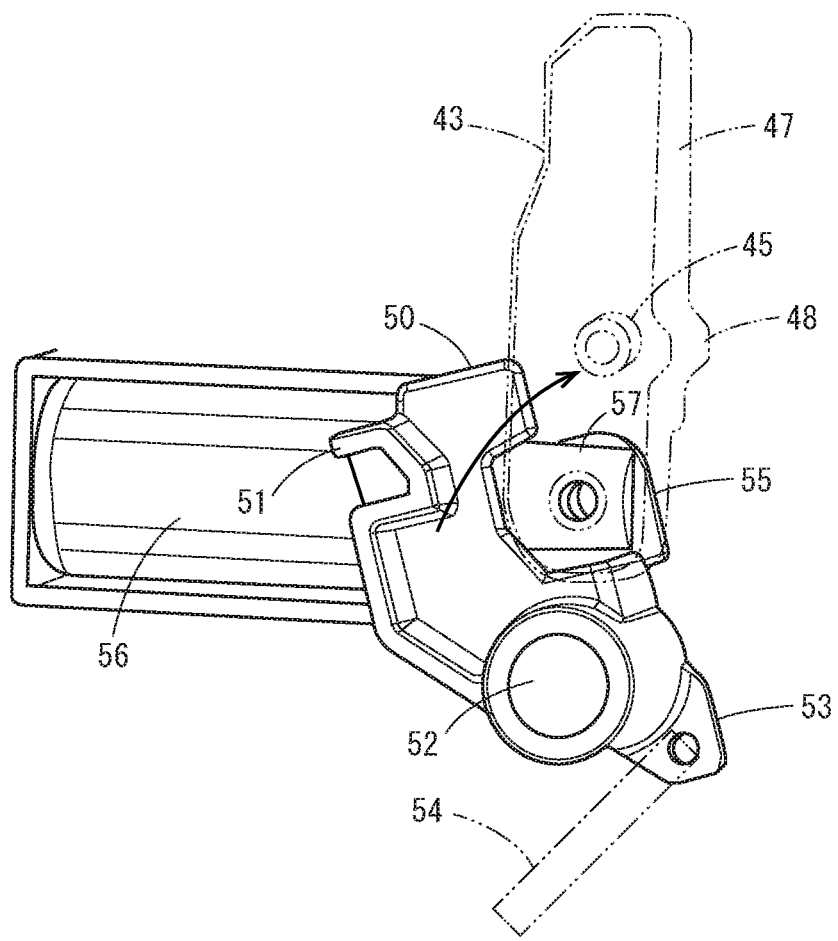
FIG. 6 is a perspective view showing the hook member in a release state according to the present embodiment.

With reference to FIG. 4, the locking mechanism of the opening/closing cover will be described. FIG. 4 is a schematic view showing the opening/closing cover and the others of this embodiment. FIG. 5 is a perspective view showing a hook member in a hooking state in this embodiment. FIG. 6 is a perspective view showing the hook member in a release state in this embodiment.

As shown in FIG. 4, the opening/closing cover 60 is supported by a pair of side plates 40 of the housing 10 in an openable and closable manner. When the opening/closing cover 60 is lifted upward from the upper surface of the housing 10, the opening/closing cover 60 is opened and the inside of the housing 10 is exposed to the outside. When the opening/closing cover 60 is lowered downward from the open state, the opening/closing cover 60 is closed to form the sheet discharge tray 12 (see FIG. 1) on the upper surface of the housing 10. Inside the housing 10, the toner containers 13 of four colors are detachably mounted from above. The toner container 13 for black color toner is positioned on the base end side of the opening/closing cover 60.

One side plate 40 (the right side plate) of the housing 10 supports the four lock members 43 that restrict the detachment of the for colors toner containers 13. The lock member 43 is formed in a rod shape. The lock member 43 is turned between the standing posture and the lying posture around a turning shaft 44 on the base end side of the lock member 43. The standing posture is an unlock posture in which the detachment of the toner container 13 is permitted by the lock member 43, and the lying posture is a locking posture in which the detachment of the toner container 13 is restricted by the lock member 43. The lock member 43 for the black color toner container 13 is wider than the other lock members 43.

Four arc-shaped guide grooves 41 are formed in one side plate 40, and a guide pin 45 is formed in each lock member 43 to be fitted into each guide groove 41. When the guide pin 45 of the lock member 43 is guided by the guide groove 41 of the side plate 40, the lock member 43 is turned smoothly between the standing posture and the lying position. A torsion spring 46 is provided on the base end side of the lock member 43, and the lock member 43 is held in the standing posture by the spring force of the torsion spring 46. One side plate 40 is provided with a hook member 50 (see FIG. 5) to hook and hold the guide pin 45 of the lock member 43 in the lying posture against the spring force of the torsion spring 46.

As shown in FIG. 5, a claw part 51 is formed on the tip end of the hook member 50 for hooking the guide pin 45 of the lock member 43. Around the turning shaft 52 on the base end side of the hook member 50, the claw part 51 is turned between a hook position where the guide pin 45 can be hooked and a release position separated from the hook position. A support bracket 53 is formed on the base end side of the hook member 50, and the support bracket 53 is connected to the housing 10 through a spring member 54. The hook member 50 is elastically supported by the spring member 54, and the claw part 51 is attracted toward the hook position by the spring force of the spring member 54.

A connection bracket 55 is provided on the base end side of the hook member 50, and a plunger 57 of a solenoid 56 is coupled to the connection bracket 55. When the solenoid 56 is not driven, the plunger 57 is pulled out and the claw part 51 of the hook member 50 is positioned in the hooking position by the spring force of the spring member 54. As shown in FIG. 6, when the solenoid 56 is driven, the plunger 57 is pulled in and the claw part 51 it turned from the hooking position to the release position against the spring force of the spring member 54. The guide pin 45 of the lock member 43 is separated from the claw part 51, and the spring force of the torsion spring 46 (see FIG. 4) returns the lock member 43 from the lying posture to the standing posture.

In order to hook the guide pin 45 by the claw part 51 of the hook member 50, it is preferable that the lock member 43 turns beyond the lying posture and the guide pin 45 moves to an overstroke position. For this reason, the lock member 43 has a protrusion 48 formed on a contact surface 47 against which an operating lever 63 described later abuts. When the protrusion 48 is pushed in, the amount of turning of the lock member 43 is increased by the protrusion 48, and the lock member 43 can be turned beyond the lying posture. When the lock member 43 is turned beyond the lying posture, the lock member 43 can be surely hooked to the hook member 50.

Returning to FIG. 4, on the lower surface of the opening/closing cover 60, a long case 61 is formed along one side plate 40 (the right side plate in this embodiment) of the housing 10. On the case 61 of the opening/closing cover 60, three operating levers 63 for operating three lock members 43 except the rear lock member 43 are turnably supported. In this embodiment, the operating levers 63 are provided corresponding to the lock members 43 of the toner containers 13 for three colors except for the black toner container 13. The operating lever 63 is shaped like a fan in the side view. Around a turning shaft 64 on the apex side of the operating lever 63, the operating levers 63 appears in and out of the case 61 through an opening in the lower surface of the case 61.

A connection arm 65 is fixed to the turning shaft 64 of the operating lever 63, and the tip of the connection arm 65 is connected to a support part 67 of the case 61 through a spring member 66. In this way, the operating lever 63 is elastically supported by the spring member 66 in the opening/closing cover 60. More specifically, the operating lever 63 is pushed out of the case 61 by the spring member 66, and the operating lever 63 is supported by the spring member 66 at a predetermined angle where the operating lever 63 diagonally abuts on the tip of the lock member 43. As the opening/closing cover 60 moves in the closing direction, the operating lever 63 operates the lock member 43 from the standing posture to the lying posture.

At this time, since the operating lever 63 diagonally abuts on the lock member 43, the lock member 43 is smoothly operated by the operating lever 63. Moreover, although the opening/closing cover 60 does not have an operating lever to operate the rear lock member 43 (for black), the case 61 diagonally abuts on the tip of the lock member 43 on the base end side of the opening/closing cover 60, and the lock member 43 is smoothly operated. When the toner container 13 is locked, the lock member 43 is moved until the lock member is in the lying posture with the movement of the opening/closing cover 60 in the closing direction, and when the toner container 13 is unlocked, the lock member 43 is returned to the standing posture by the solenoid 56 (see FIG. 5).

As described above, the locking mechanism 39 of this embodiment is configured each member provided on the opening/closing cover 60 and each member provided on the housing 10. The housing 10 is provided with four remaining amount sensors 71 which detect the remaining amount of toner in the four toner containers 13, an open/close detection switch 72 which detects the open/close state of the opening/closing cover 60, and a control part 73 connected to the solenoid 56. As the remaining amount sensor 71, a permeability sensor is used to detect the permeability according to the remaining amount of the toner. The permeability is detected by the remaining amount sensor 71, and a voltage value corresponding to the detection result is output from the remaining amount sensor 71 to the control part 73.

The open/close detection switch 72 is configured to turn ON and OFF in accordance with the opening/closing operation of the opening/closing cover 60. When the opening/closing cover 60 is opened, the open/close detection switch 72 is turned ON, and a detection signal is output from the open/close detection switch 72 to the control part 73. When the remaining amount of the toner detected by the remaining amount sensor 71 becomes less than a predetermined amount and the detection signal is input from the open/close detection switch 72, the control part 73 drives the solenoid 56 to unlock the toner container 13. The lock member 43 is held in the lying posture until the remaining amount of the toner is equal to or smaller than the predetermined amount, and the replacement of the toner container 13 before the toner is used up is prevented.

The control part 73 may be realized by software using a processor or by a logic circuit (hardware) formed in an integrated circuit or the like. When the processor is used, various processes are performed by the processor reading and executing a program stored in memory. As the processor, for example, a CPU (Central Processing Unit) is used. The memory is composed of one or more storage media such as ROM (Read Only Memory) or RAM (Random Access Memory) depending on the application.

The locking and unlocking operations by the locking mechanism will be described with reference to FIG. 7 to FIG. 10. FIG. 7 to FIG. 10 are schematic views showing an example of the locking operation of the locking mechanism of this embodiment. FIG. 10 is a schematic view showing an example of the unlocking operation of the locking mechanism of this embodiment. Here, the locking operation by the front operating lever of the opening/closing cover is described, but the same applies to the locking operation by other operating levers.

Figure 7:
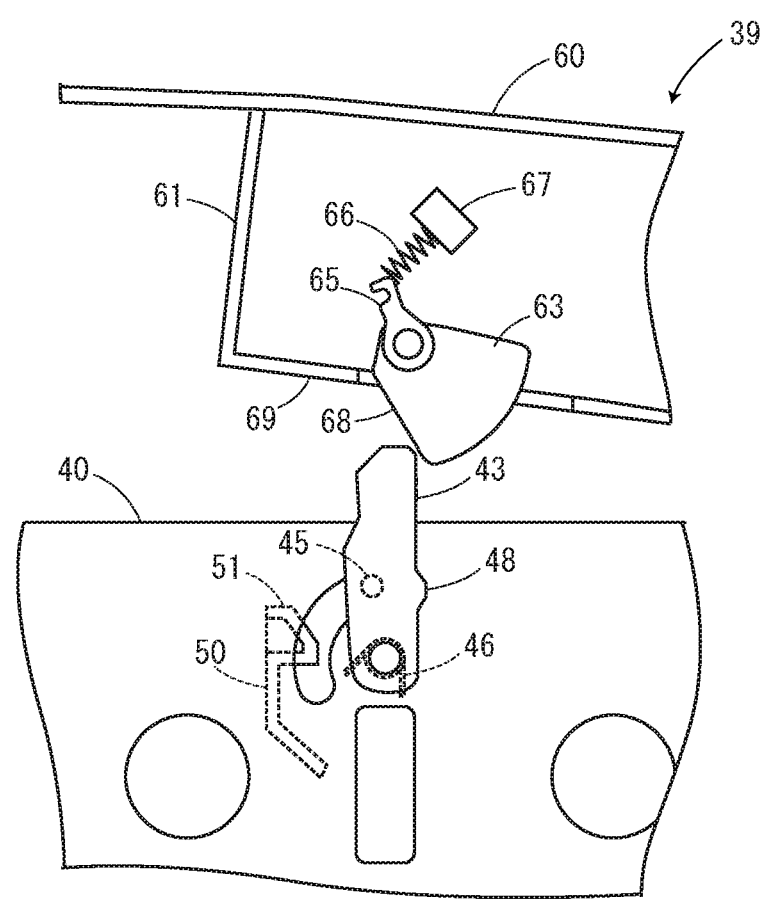
FIG. 7 is a schematic view showing an example of a locking operation of the locking mechanism according to the present embodiment.

As shown in FIG. 7, when the opening/closing cover 60 is opened, the lock member 43 is held in the standing posture by the spring force of the torsion spring 46. At this time, the claw part 51 of the hook member 50 is positioned at the hooking position, but the guide pin 45 of the lock member 43 is separated from the claw part 51 of the hook member 50. Moreover, the operating lever 63 is pushed out of the case 61 of the opening/closing cover 60 by the spring member 66, and the lower surface 68 of the operating lever 63 is tilted against the lower surface 69 of the case 61. When the opening/closing cover 60 is moved in the closing direction, the lower surface 68 of the operating lever 63 comes into contact with the tip of the lock member 43 from diagonally above.

Figure 8:
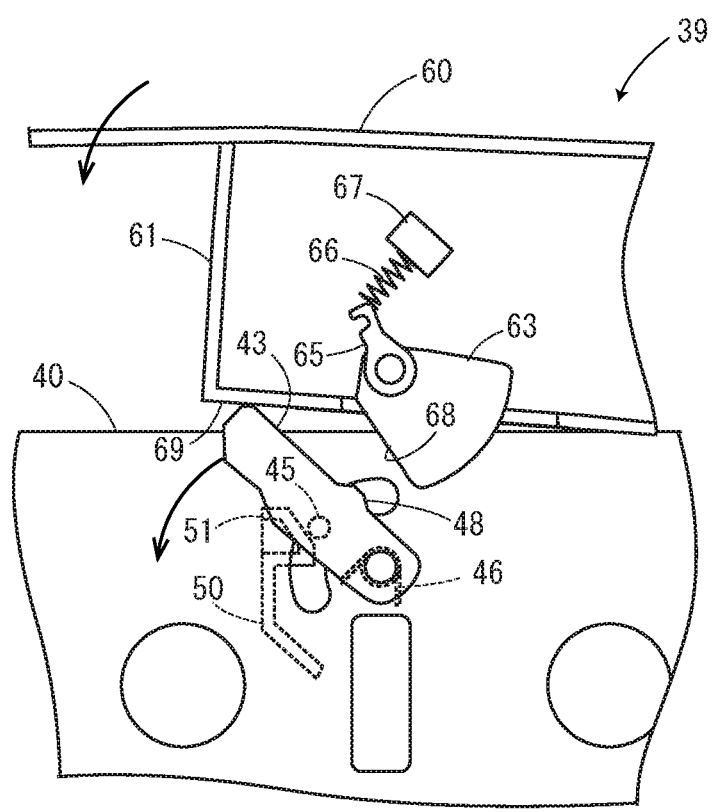
FIG. 8 is a schematic view showing an example of a locking operation of the locking mechanism according to the present embodiment.

As shown in FIG. 8, when the tip of the lock member 43 is pushed in by the lower surface 68 of the operating lever 63, the lock member 43 begins to be turned from the standing posture to the lying posture against the spring force of the torsion spring 46. When the lock member 43 is tilted by the operating lever 63, the operating lever 63 is separated from the lock member 43, and the lower surface 69 of the case 61 positioned in front of the operating lever 63 comes into contact with the lock member 43 from diagonally above. At this time, the guide pin 45 of the lock member 43 abuts against the claw part 51 of the hook member 50, and the claw part 51 of the hook member 50 is pushed in toward the release position.

Figure 9:
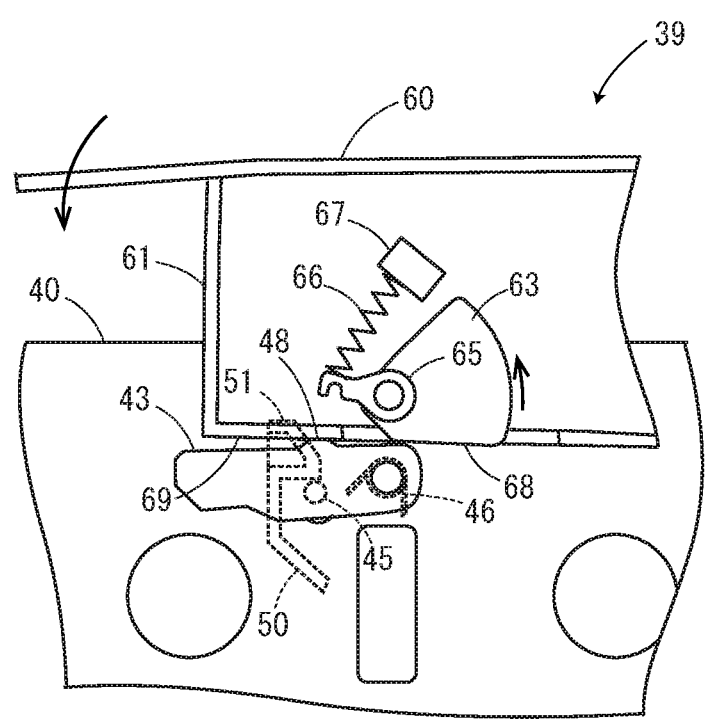
FIG. 9 is a schematic view showing an example of a locking operation of the locking mechanism according to the present embodiment.
Figure 10:
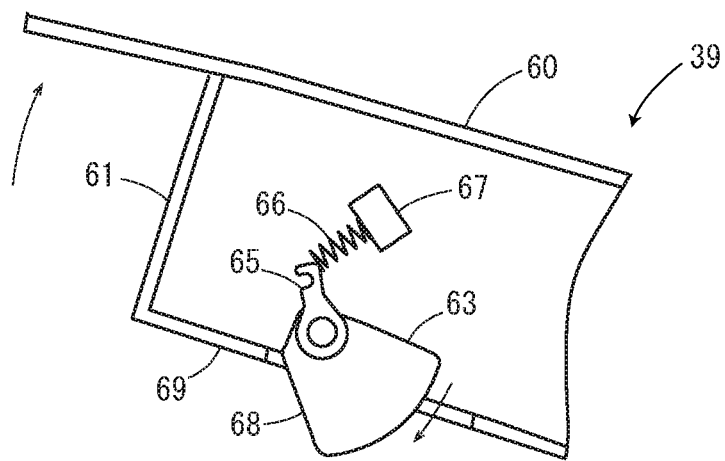
FIG. 10 is a schematic view showing an example of an unlocking operation of the locking mechanism according to the present embodiment.
Figure 10:
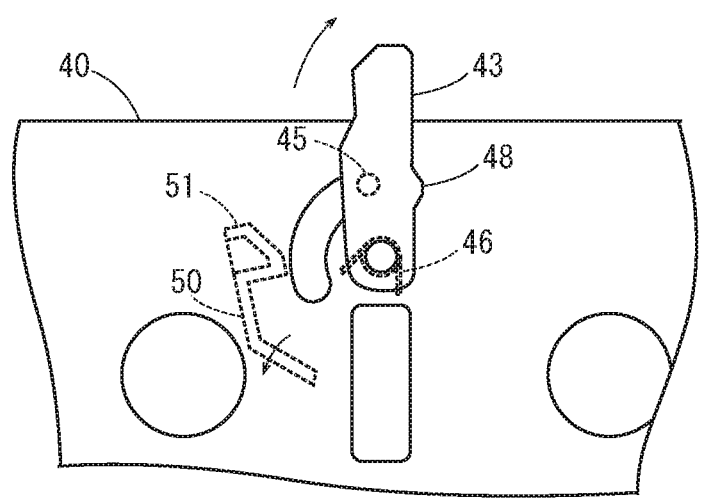

As shown in FIG. 9, when the opening/closing cover 60 is closed, the lock member 43 is turned to the lying posture by the lower surface 69 of the case 61. When the protrusion 48 of the lock member 43 is pushed in by the lower surface 69 of the case 61, the lock member 43 is temporarily turned to a slightly lower position than the lying posture, and the lock member 43 is returned to the lying posture by a reaction of the opening/closing cover 60, member tolerances, or the like. At this time, the guide pin 45 of the lock member 43 is turned to the overstroke position below the claw part 51 of the hook member 50, and the guide pin 45 of the lock member 43 is securely hooked by the claw part 51 of the hook member 50.

In addition, the operating lever 63 abuts against the base end portion of the lock member 43 from above, so that the operating lever 63 is pushed up against the spring force of the spring member 66 by the reaction force from the lock member 43. Since the base end portion of the lock member 43 is the turning center, the base end portion of the lock member 43 cannot be turned even when applied with an external force. As described above, although the lock member 43 is turned the position lower than the lying posture by the lower surface 69 of the case 61, since the operating lever 63 is retreated into the case 61, the base end portion of the lock member 43 is not applied with the excessive external force from the operating lever 63. Therefore, deformation and breakage of the lock member 43 are prevented.

As shown in FIG. 10, when the remaining amount of the toner in the toner container 13 is equal to or smaller than the predetermined amount and the opening/closing cover 60 is opened, the solenoid 56 is driven to move the claw part 51 of the hook member 50 from the hooking position to the release position. The guide pin 45 of the lock member 43 is separated from the claw part 51 of the hook member 50, and the lock member 43 is returned from the lying posture to the standing posture by the spring force of the torsion spring 46. Thus, even when the opening/closing cover 60 is opened, until the remaining amount of the toner in the toner container 13 becomes small, the solenoid 56 is not driven and the detachment of the toner container 13 is restricted by the lock member 43.

As described above, according to this embodiment, the lock member 43 is operated from the standing posture to the lying posture by the operating lever 63 in conjunction with the movement of the opening/closing cover 60 in the closing direction. Therefore, when the opening/closing cover 60 is closed, the locking operation after replacing the toner container can be performed reliably. Even when the operating lever 63 comes in contact with the lock member 43, the operating lever 63 is retreated against the spring force of the spring member 66, so that the lock member 43 is not applied with the excessive external force from the operating lever 63. Therefore, deformation and breakage of members such as the lock member 43 and the operating lever 63 are prevented. Moreover, the detachment of the toner container 13 can be restricted to prevent the toner container 13 from being replaced before the toner is used up.

Although an example in which the unlock posture is the standing posture is described in this embodiment, the unlock posture may be a posture in which the detachment of the toner container is acceptable. In addition, although an example in which the lock posture is the lying posture is described, the lock posture only needs to be a posture in which the detachment of the toner container can be restricted. For example, the unlock posture may be the lying posture and the lock posture may be the standing posture.

Although the configuration in which the toner container is attached to and detached from the housing from above is described in this embodiment, the toner container may be attached to and detached from the housing from the lateral side.

Although the configuration in which the lock member is operated by the operating lever and the case is described in this embodiment, the lock member may be operated from the standing posture to the lying posture by the operating lever alone.

In the present embodiment, the protrusion is formed on the contact surface of the lock member, but the protrusion needs not be formed on the contact surface of the lock member.

In the present embodiment, the operating lever is configured to abut on the tip of the lock member diagonally, but the operating lever only needs to be formed such that the lock member can be operated.

Moreover, in the present embodiment, the sheet may be a sheet-like object to form an image, for example, plain paper, coated paper, tracing paper, or an OHP (Over Head Projector) sheet.

In this embodiment, the printer is shown as an example of the image forming device, but it is not limited to this configuration. In addition to a copying machine and a facsimile machine, the image forming apparatus may be a multifunction peripheral equipped with a combination of printing, copying and faxing functions.

The present embodiment has been described, but as another embodiment, the above embodiment and a variation may be wholly or partially combined.

The technology of the present invention is not limited to the above embodiment, and may be changed, replaced or modified in various ways without departing from the purport of the technical idea. Furthermore, if technological ideas can be realized in a different way by technological progress or a derived different technology, they may be implemented using that method. Thus, the claims cover all possible implementations within the scope of technical thought.

The invention claimed is:

1. A locking mechanism of a toner container which is replaceable in a state where an opening/closing cover supported by a housing is opened, the locking mechanism comprising:

a lock member provided in the housing and restricting a detachment of the toner container;

an operating lever turnably supported by the opening/closing cover and operating the lock member; and a spring member provided in the opening/closing cover and supporting the operating lever elastically, wherein the lock member is turnable between an unlock posture in which the detachment of the toner container is permitted and a lock posture in which the detachment of the toner container is restricted, and the operating lever operates the lock member from the unlock posture to the lock posture according to a movement of the opening/closing cover to a closing direction.

2. The locking mechanism according to claim 1, wherein the spring member supports the operating lever at a predetermined angle where the operating lever abuts on a tip end of the lock member diagonally.

3. The locking mechanism according to claim 1, comprising:

a hook member which hooks the lock member turned to the lock posture, wherein the lock member is turned beyond the lock posture, and the hook member hooks the lock member in the lock posture.

4. The locking mechanism according to claim 3, wherein the lock member has a protrusion on a contact surface against which the operating lever abuts, and the lock member is turned beyond the lock posture by the protrusion.

5. The locking mechanism according to claim 1, wherein a hollow case is provided on a lower surface of the opening/closing cover, the operating lever is supported by the case so as to appear in and out, and the operating lever is retreated into the case according to the movement of the opening/closing cover in the closing direction.

6. The locking mechanism according to claim 5, wherein the lock member is operated by the operating lever until it is tuned to the lock posture, when the lock member is turned beyond the posture, the operating lever is retreated into the case and then the lock member is operated by the case.

7. An image forming apparatus comprising:

the locking mechanism according to claim 1; and a remaining amount sensor which detects a remaining amount of the toner in the toner container, wherein the lock member is held in the lock posture until the remaining amount of the toner is equal to or smaller than a predetermined amount.

* * * * *